United States Patent
Lyons et al.

[11] Patent Number: 6,075,798
[45] Date of Patent: Jun. 13, 2000

[54] EXTENDED HEADER FOR USE IN ATM ADAPTATION LAYER TYPE 2 PACKETS

[75] Inventors: Terry Gregory Lyons, Princeton; Kotikalapudi Sriram, Marlboro, both of N.J.

[73] Assignee: Lucent Technologies Inc., Murray Hill, N.J.

[21] Appl. No.: 08/880,181

[22] Filed: Jun. 20, 1997

[51] Int. Cl.[7] .................................................. H04J 3/24
[52] U.S. Cl. ...................... 370/474; 370/465; 370/521
[58] Field of Search .................................. 370/395, 389, 370/392, 474, 475, 401, 463, 465, 466, 470, 471, 472, 476, 521

[56] References Cited

U.S. PATENT DOCUMENTS

| | | | |
|---|---|---|---|
| 5,293,379 | 3/1994 | Carr | 370/474 |
| 5,471,474 | 11/1995 | Grobicki et al. | 370/395 |
| 5,809,022 | 9/1998 | Byers et al. | 370/474 |
| 5,822,321 | 10/1998 | Petersen et al. | 370/474 |
| 5,862,452 | 1/1999 | Cudak et al. | 455/6.3 |
| 5,917,830 | 6/1999 | Chen et al. | 370/487 |

*Primary Examiner*—Ricky Ngo
*Attorney, Agent, or Firm*—J. J. Opalach

[57] ABSTRACT

A packet voice system includes an ATM Adaptation Layer Type 2 (AAL-2) and Service Specific Convergence Sublayer (SSCS) System comprising a transmitter and a receiver. A portion of the 32 codepoints of the five bit RES (or UUI) field of the AAL-2 header are predefined to indicate an extended header. This a prior definition is stored in tables in both the transmitter and the receiver. The extended header itself comprises an additional octet appended to the AAL-2 header. A sequence number is normally carried in the RES field for the packet stream of voice calls that require sequence numbers. When the extended header is used, the sequence number is part of the extended header and thus messages are conveyed from the transmitter to the receiver without causing an interruption to sequence number assignment messages The transmitter dynamically uses the extended header and discontinues use of the extended header after a predefined duration of time or upon receiving an acknowledgment from the receiver.

17 Claims, 8 Drawing Sheets

PACKET HEADER (3 OCTETS)

FIG. 8

| 5-BIT CODE POINT VALUE IN UUI FIELD OF AAL2 HEADER AND EXTENDED HEADER 0th BIT VALUE | WHAT IT MEANS |
| --- | --- |
| 0 THROUGH 15 (EH ABSENT) | AGREED-TO CODING TYPE (E.G., 32 kb/s ADPCM) WITH 4-BIT SEQUENCE NUMBER. LAST FOUR BITS GIVE SEQUENCE NUMBER. |
| 16 WITH 0th BIT IN EH SET TO 0 | TRANSITION TO CODING TYPE 1 (64 kb/s UNCOMPRESSED PCM); BITS 1-4 OF EH GIVE SEQUENCE NUMBER |
| 16 WITH 0th BIT OF EH SET TO 1 | TRANSITION TO CODING TYPE 2 (32 kb/s G.727 ADPCM); BITS 1-4 OF EH GIVE SEQUENCE NUMBER |
| 17 WITH 0th BIT OF EH SET TO 0 | TRANSITION TO CODING TYPE 3; G.727 24 kb/s; BITS 1-4 OF EH GIVE SEQUENCE NUMBER |
| 17 WITH 0th BIT OF EH SET TO 1 | TRANSITION TO CODING TYPE 4; G.727 16 kb/s; BITS 1-4 OF EH GIVE SEQUENCE NUMBER |
| 18 WITH 0th BIT OF EH SET TO 0 | TRANSITION TO CODING TYPE 5; 40 kb/s ADPCM; BITS 1-4 OF EH GIVE SEQUENCE NUMBER |
| 18 WITH 0th BIT OF EH SET TO 1 | TRANSITION TO CODING TYPE 6; LD-CELP; BITS 1-4 OF EH GIVE SEQUENCE NUMBER |
| 19 WITH 0th BIT OF EH SET TO 0 | TRANSITION TO CODING TYPE 7; BITS 1-4 OF EH GIVE SEQUENCE NUMBER |
| 19 WITH 0th BIT OF EH SET TO 0 | TRANSITION TO CODING TYPE 8; BITS 1-4 OF EH GIVE SEQUENCE NUMBER |
| 20 (EH PRESENT) | FOR AN AGREED-TO CODING TYPE, BITS 0-4 OF EH GIVE A 5-BIT SEQUENCE NUMBER |
| 21-25 (PRESENCE OF EH TO BE SPECIFIED) | TO BE SPECIFIED |
| 26 (EH ABSENT) | G3 FAX DEMOD IN PAYLOAD (HAS APPLICATION LAYER SEQUENCE NUMBER IN THE PAYLOAD) |
| 27 (EH ABSENT) | CHANNEL ASSOCIATED SIGNALING (CAS) IN THE PAYLOAD; HAS APPLICATION LAYER SEQUENCE NUMBER IN THE PAYLOAD |
| 28-29 (PRESENCE OF EH TO BE SPECIFIED) | RESERVED FOR FUTURE USE |
| 30-31 | MANAGEMENT |

EXTENDED HEADER FOR USE IN ATM ADAPTATION LAYER TYPE 2 PACKETS

FIELD OF THE INVENTION

This invention relates generally to communications and, more particularly, to packet systems using ATM Adaptation Layer Type 2 packets.

BACKGROUND OF THE INVENTION

Asynchronous transfer mode (ATM) networks carry fixed sized cells within the network irrespective of the applications being carried over ATM. At the network edge or at the end equipment, an ATM Adaptation Layer (AAL) maps the services offered by the ATM network to the services required by the application. There are a number of industry standards and proposed standards covering various AALs. In particular, "B-ISDN ATM Adaptation Layer Type 2 Specification," draft Recommendation I.363.2, November 1996, of ITU-T (herein referred to as AAL-2) provides for efficient ATM transport of small, delay-sensitive packets in such applications as packet voice systems. AAL-2 is partitioned into two sublayers, the Common Part Sublayer (CPS) and the Service Specific Convergence Sublayer (SSCS).

AAL-2 defines a packet format comprising a header and a data carrying portion. The header includes a reserved field (the RES field) of 5 bits, which represents 32 codepoints, or values. The RES field is either reserved or assigned to either the CPS or a Service Specific Convergence Function (SSCF) of the SSCS.

The CPS provides the functions of multiplexing variable length packets from multiple sources into a single ATM virtual circuit and relaying these packets to form end-to-end AAL-2 connections. That portion of the RES field assigned to the CPS is used to provide user information or signaling such as a "More" bit to indicate that the current packet is segmented (i.e., the continuation of an upper-layer frame). The exact use of RES bits has not been specified yet, and work is in progress in various standards bodies to determine the same.

In the context an SSCS system conveying packet voice, the RES field is being defined in standards groups for possible use in conveying SSCS messages including sequence number information. The latter is used by a receiver to re-build a received sequence of packets in the correct order.

SUMMARY OF THE INVENTION

As noted above, the RES field is a five bit value that provides 32 codepoints, each of which can be used to convey either messaging or sequence numbers. However, we have realized that the above-mentioned five bit RES field is too small for some applications, e.g., in the context of an SSCS system where additional information (such as a coding rate change during a call) needs to be transmitted to a corresponding receiver. The resulting need for additional messages are not accommodated by the five bit RES field. Therefore, and in accordance with the principles of the invention, an AAL-2 RES field is extended a predefined number of bits by a priori mapping individual codepoints of the five bit RES field to indicate an extended header.

In an embodiment of the invention, a packet voice system includes an AAL-2 and Service Specific Convergence Sublayer (SSCS) System comprising a transmitter and a receiver. A portion of the 32 codepoints of the five bit RES field are predefined to indicate an extended header. This a prior definition is stored in tables in both the transmitter and the receiver. The extended header itself comprises an additional octet appended to the AAL-2 header. The transmitter dynamically uses the extended header and discontinues use of the extended header after a predefined duration of time or upon receiving an acknowledgment from the receiver. The ability to use an extended header selectively on a few packets for the purpose of conveying in-call messages (e.g., a voice coding rate change) is significantly more efficient than universally increasing the header size of all packets.

BRIEF DESCRIPTION OF THE DRAWING

FIG. 8 shows an illustrative mapping table for use in a transmitter and a receiver in accordance with the principles of the invention;

DETAILED DESCRIPTION

Figure 1:
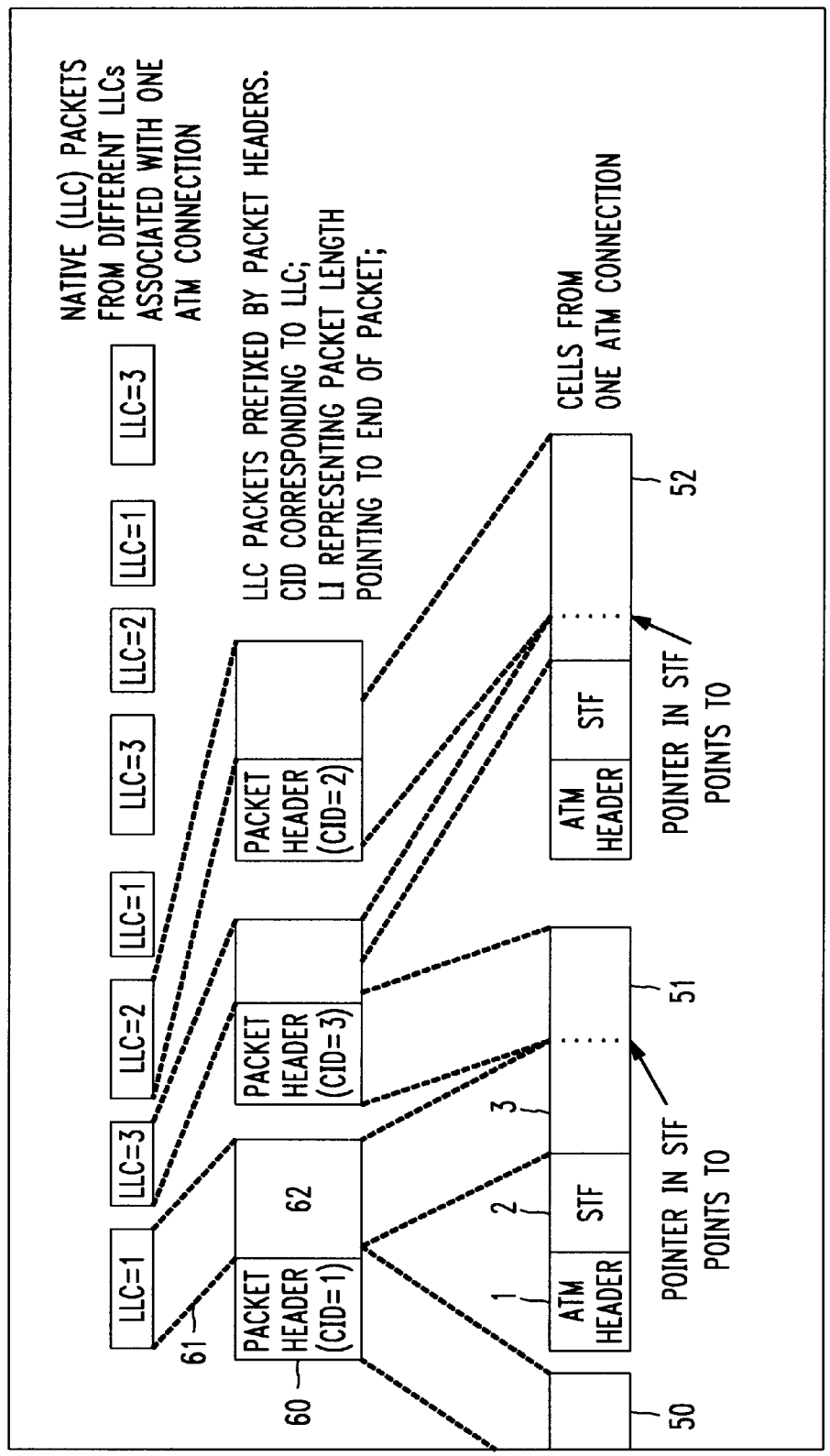
FIG. 1 shows an illustrative ATM cell and AAL-2 formatting.

Before describing an illustrative embodiment of the invention, some background information on ATM Adaptation Layers (AALs) and, more particularly, AAL-2, is provided.

AAL-2

ATM networks carry fixed size (53 octets) cells within the network irrespective of the applications being carried over ATM. To support applications in native protocol mode, a Terminal Adapter (TA) at the network edge acts as an 'ATM user' and implements an ATM Adaptation Layer (AAL) to map the services offered by the ATM network to the services required by the application. In cases where ATM is terminated at the end user equipment, the AAL entity is implemented there. AAL-1 has been defined for Constant Bit Rate (CBR) traffic requiring tight delay and jitter control (e.g., see ITU-T Recommendation I.363.1 B-ISDN ATM Adaptation Layer AAL-1 Specification). Also AAL-3/4 (e.g., see ITU-T Recommendation I.363.3/4 B-ISDN ATM Adaptation Layer AAL 3/4 Specification) and AAL-5 (e.g., see ITU-T Recommendation I.363.5 B-ISDN ATM Adaptation Layer AAL-5 Specification) have been defined for bursty data. These AALs allow simple encapsulation of application 'packets' if each packet fits into one ATM cell. For larger application packets, a segmentation and reassembly (SAR)

layer allows segmentation of a 'packet' at the transmitter, so each segment fits into an ATM cell, and reassembly of the original packet from the received ATM cells at the receiver. These AALs thus allow collection of enough information to fit into one ATM cell payload or segmentation of larger native mode packets into smaller units such that each smaller unit fits into an ATM cell payload. If native information units are smaller than an ATM payload, these AALs require partial fill of ATM cells.

However, many applications require ATM transport of 'small packets' that are smaller than the ATM cell size. Some of these applications are: PBX-to-PBX trunking for compressed voice with or without silence suppression; ATM backbone for cellular/PCS wireless access; ATM trunking between circuit switches; and ATM backbone connectivity to packet telephony.

In applications like the ones mentioned above, there are two primary reasons to transmit small packets across ATM networks: (i) when small native packets are generated away from the ATM network and the packet boundaries need to be recovered at the destination outside ATM network; and (ii) when the bit rate of a native application is low and the requirement on the end-to-end delay prohibits accumulation of bits to fill an ATM cell before sending the cell out to its destination. In the latter case, small packets are generated even if the packetization is done at the ATM network edge. Use of an ATM network to connect base stations to vocoder groups in digital cellular systems is an example of the former. ATM trunking between circuit switches or circuit PBXs is an example of the latter.

For these applications, partial fill of ATM cells resulting from use of AAL-1, AAL-3/4, or AAL-5, may cause unacceptable loss in bandwidth efficiency. This inefficiency is of concern especially when the total traffic demand needs low speed leased lines because of the high cost/bps (bits per second) of such lines. In many cases, this cost penalty may nullify many of the advantages offered by an ATM backbone. This necessitates use of an AAL for small packets such as AAL-2. The latter provides efficient transport of small native packets over ATM networks in such a way that allows very small transfer delay across the ATM network and still allows the receiver to recover the original packets.

AAL-2 treats the payloads from successive ATM cells from the same ATM connection as a byte stream in which variable length LLC packets are multiplexed. An illustration of ATM cells and AAL-2 formatting is shown in FIG. 1. An ATM connection comprises a plurality of ATM cells, a portion of which is represented by the sequence of ATM cells 50, 51, and 52. Each ATM cell comprises an ATM header 1 (as known in the art), an STF field 2 and a plurality of LLC packets 3 (defined below). Each LLC packet, as represented by LLC packet 60 comprises a packet header 61 and a native LLC packet 62.

Figure 2:
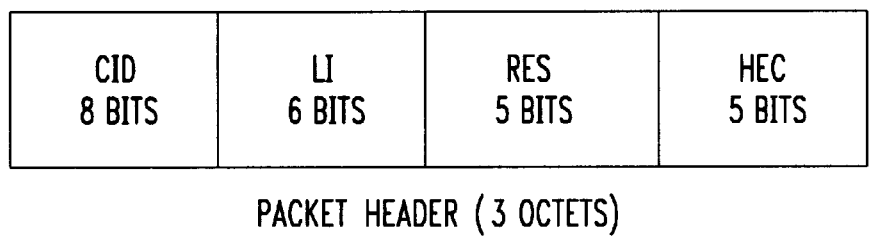
FIG. 2 shows a packet header of an LLC packet in accordance with AAL-2.

The packet header is 3 octets long and is shown in detail in FIG. 2. The packet header comprises four fields: a Channel ID (CID) field, a Length Indicator (LI) field, a Reserved (RES) field, and a Header Error Check (HEC) field. (The RES field is also referred to as UUI (user-to-user indication) in standards documents.)

The CID field is 8 bits long and identifies the LLC to which the packet belongs. (Referring briefly back to FIG. 1, it is can be observed that the CID field value for the associated LLC packet corresponds to the LLC number.) The CID field provides support for a maximum of 255 native connections (LLCs) over a single ATM VCC. As known in the art, an ATM cell header allows two levels of addressing: a Virtual Path Identifier (VPI) and Virtual Connection Identifier (VCI). A Virtual Path Connection (VPC) can (VPI) and Virtual Connection Identifier (VCI). A Virtual Path Connection (VPC) can have a number of VCCs. With a 16 bit VCI field, an ATM VPC can support up to $255 \times 2^{16}$ Logical Link Connections.

The LI field is 6 bits and indicates the length of the LLC packet (or native packet). The LI field is added to each LLC packet so that the end of variable length packets can be demarcated. The LI field allows specification of up to 63 octets. When the value of the LI field points beyond the end of the current ATM cell, the packet is split between cells (this is also illustrated in FIG. 1, where LLC packet 60 is split between ATM cells 50 and 51).

Since the primary driver for AAL-2 is packet telephony, and error detection is not essential for voice coding algorithms, error detection for native packets is not necessary. The purpose of error detection is to guarantee that CID, LI and other critical protocol header fields do not get misinterpreted. This is accomplished in AAL-2 by the HEC field in each packet header. The HEC field is 5 bits (e.g., see FIG. 2) and provides error detection over the packet header. This has the advantage of being able to discard only those packets whose headers are corrupted.

AAL-2 is partitioned into two sublayers, the Common Part Sublayer (CPS) and the Service Specific Convergence Sublayer (SSCS). The RES field comprises five bits, which are reserved or assigned to either the CPS or a Service Specific Convergence Function (SSCF) of the SSCS. The CPS provides the functions of multiplexing variable length packets from multiple sources into a single ATM virtual circuit and relaying these packets to form end-to-end AAL-2 connections. That portion (not shown) of the RES field assigned to the CPS are used to provide signaling such as a "More" bit to indicate that the current packet is segmented, signaling, or user information. The remaining portion (not shown) of the RES field assigned to the SSCF provides an application specific function, a different instance of being provided to each AAL-2 user. Examples of such functions are segmentation and reassembly of user flows into packets suitable for the common part, forward error control, identifying the voice coding algorithm, identifying the end of a speech burst, packet sequence number, etc. The SSCS can also be null. (At this point, the ITU-T standards body intends to specify SSCS protocols in future recommendations.) These SSCF-oriented bits are not interpreted by the AAL-2 CPS and are passed transparently from the transmitting SSCS to the receiving SSCS. The SSCS may use these bits for specific SSCF functions or to pass higher layer user-to-user communication transparently. In the context of this description, it is assumed that the earlier-described sequence number is normally a part of the RES field for each packet. (However, and in accordance with the principles of the invention, when an extended header is used, the sequence number is carried in the extended header, described below.)

Figure 3:
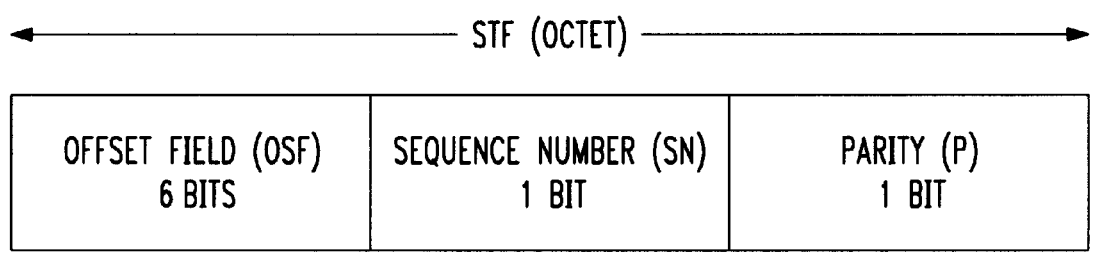
FIG. 3 shows a start field of an ATM cell in accordance with AAL-2.

As can be observed from FIG. 1, a Start Field (STF) is present at the beginning of each ATM cell payload from a given ATM connection. The format of the STF field is shown in FIG. 3. An STF field is 1 octet in length and comprises an Offset field (OSF), a Sequence Number (SN) field and a Parity (P) field.

While the LI field in each LLC packet allows self delineation once a packet boundary is identified, a cell loss or an error in a packet header results in the loss of packet delineation. In order to regain packet boundaries, the OSF field specifies the beginning of the first new packet in the current ATM cell payload. The OSF field is 6 bits in length and indicates the remaining length of the packet that (possibly) started in the preceding cell from this ATM connection and is continuing in the current cell. This approach guarantees resynchronization of packet boundaries in one ATM cell time after a delineation loss.

Given that a loss of an ATM cell, if not detected at the receiver, can misconcatenate packets, the SN field also exists. The one bit SN field provides a modulo 2 sequence numbering of cells and immediate detection of a single cell loss. It may be noted that this 1-bit sequence number is different from the earlier-described sequence number which is part of the RES field in the AAL-2 packet header.

Finally, like the packet header, the SN field and OSF field also require error detection. This is provided by the single parity bit of the P field, which provides odd parity.

It should be noted that it may be necessary to transmit a partially filled ATM cell in order to limit the packet emission delay. In this case, the remainder of the cell is padded with all-zero octets. A cell whose payload contains only the STF field and 47 padding octets can also be transmitted in order to meet some other needs such as serving a "keep-alive" function, satisfying a traffic contract, etc.

AAL-2 creates multiple levels of connections between two points: ATM virtual connections and AAL-2 Logical Link Connections (LLCs). The AAL-2 LLC in this case is defined to be a point-to-point connection, for example, between a base station and the vocoder group in the Mobile Switching Center (MSC) for cellular trunking, or between two PBX's or two switches for land-line trunking. The connection is defined to be bi-directional and the same CID is assumed to be used in both directions for a particular LLC. The set of CIDs available on an ATM VCC are known to both ends.

The negotiation procedures are symmetric, that is, either end of the AAL-2 connection is permitted to initiate a new LLC or request tear down of an LLC. A simple negotiation procedure is defined where the originating end proposes establishment of a new LLC with the use of a particular CID that is not in use and the other end can accept or deny the request. Bandwidth management and monitoring for the ATM virtual circuit is assumed to be handled at the ATM connection management level. No such monitoring is proposed per LLC. However, it is the responsibility of the two end points to guarantee resource availability within the ATM connection to support a new LLC. Such resource management is assumed to be handled in a service specific manner. Signaling needed for LLC set up and tear down between AAL-2 uses a predefined LLC (with CID=0).

Use of Sequence Numbers in Re-Playing Packets

Figure 4:
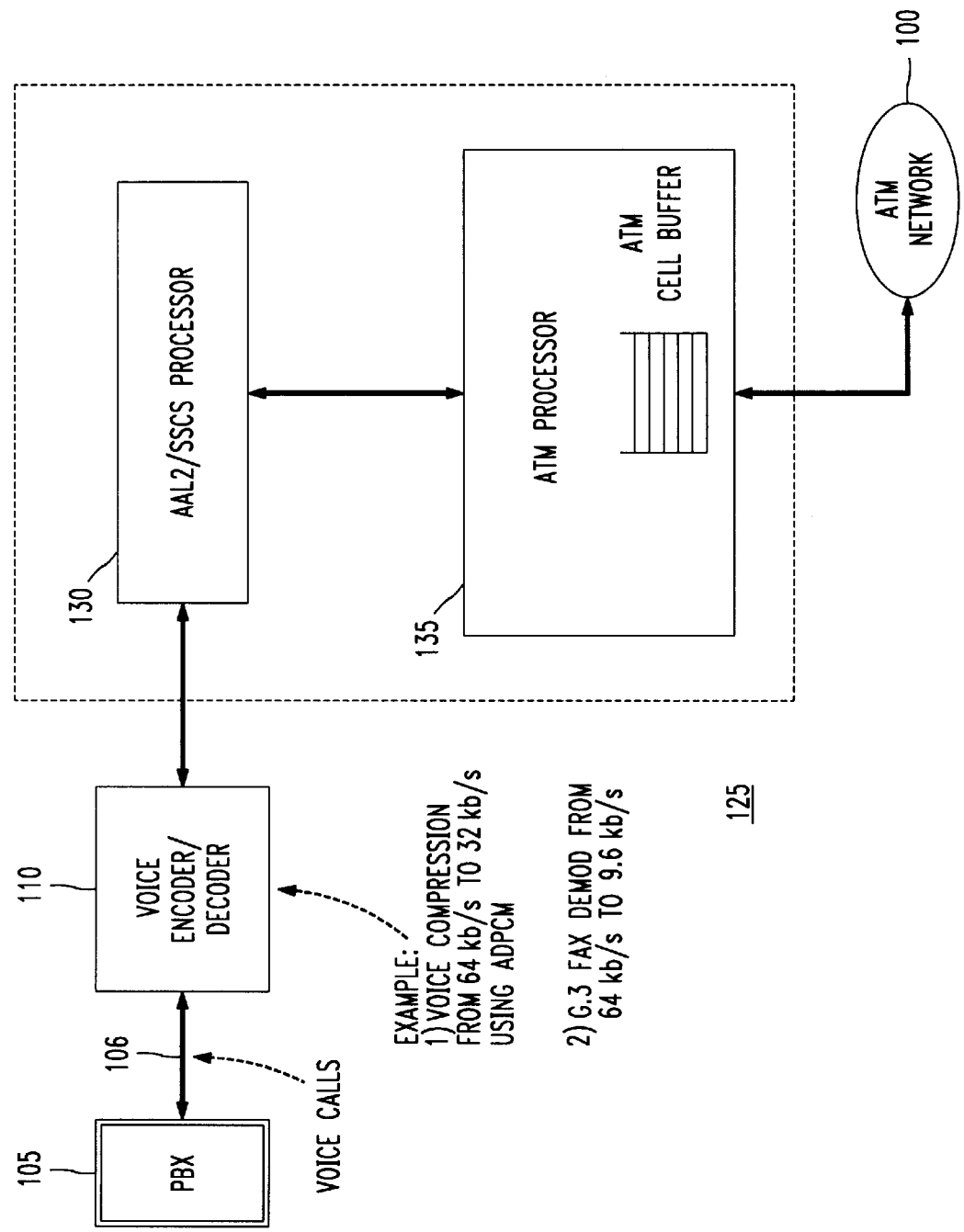
FIG. 4 shows a portion of a voice packet communications system.

A portion of a voice packet communications system is shown in FIG. 4. Other than the inventive concept, the elements shown in FIG. 4 are well-known and will not be described in detail. For example, although shown as a single block element, PBX 105 includes stored-program-control processors, memory, and appropriate interface cards. Similarly, Private Branch Exchange (PBX) 105 transmits and receives a plurality of voice calls to voice encoder/decoder 110, via facility 106. The latter is representative of any number and type of communications facilities. To facilitate the description it is assumed that facility 106 is a DS1 facility (for each direction) as known in the art, which carries a plurality of calls. For each call, the audio information is a 64 kb/s (thousands of bits per second) bit stream in either direction. Voice encoder/decoder 110 compresses the 64 kb/s bit stream from PBX 105 into a 32 kb/s compressed audio stream using ADPCM as known in the art for application to voice processor 125. Similarly, in the other direction, voice encoder/decoder 110 decompresses the 32 kb/s ADPCM bit stream provided by voice processor 125 into a 64 kb/s audio stream for application to PBX 105.

Voice processor 125 comprises AAL-2/SSCS processor 130 and ATM processor 135. In transmitting information toward ATM network 100, AAL-2/SSCS processor 130 converts the 32 kb/s ADPCM bit stream into AAL-2 packets for application to ATM processor 135. In this conversion, as described further below, the SSCS portion of processor 130 performs silence suppression, assignment of sequence numbers; and background noise level notification. In the opposite direction, AAL-2/SSCS processor 130 receives AAL-2 packets from ATM processor 135 and depacketizes them. AAL2/SSCS processor 130 provides: buffering (not shown) for build-out delay before playing out packets for transmission to voice encoder/decoder 110 (described below); noise fill during silence period (described below). In playing out the packets, AAL-2/SSCS processor 130 makes use of sequence numbers to decide delayed packets and to maintain integrity in the play-out process (described below).

ATM processor 135 provides the following transmit functions: filling payload of ATM cells with AAL-2 packets; forming an ATM cell whenever the payload is filled-up or a timer (e.g., 2 milli-seconds (ms)) expires with at least one AAL-2 packet in the payload (whichever of the two events happens first); ATM cell header processing; placing ATM cells into a transmit buffer, etc. ATM processor 135 provides ATM cells to ATM network 100. ATM processor 135 receives ATM cells from ATM network 100 and provides the following receive functions: ATM cell header processing and error control; transferring AAL-2 packets to AAL-2/SSCS processing unit, etc.

Figure 5:
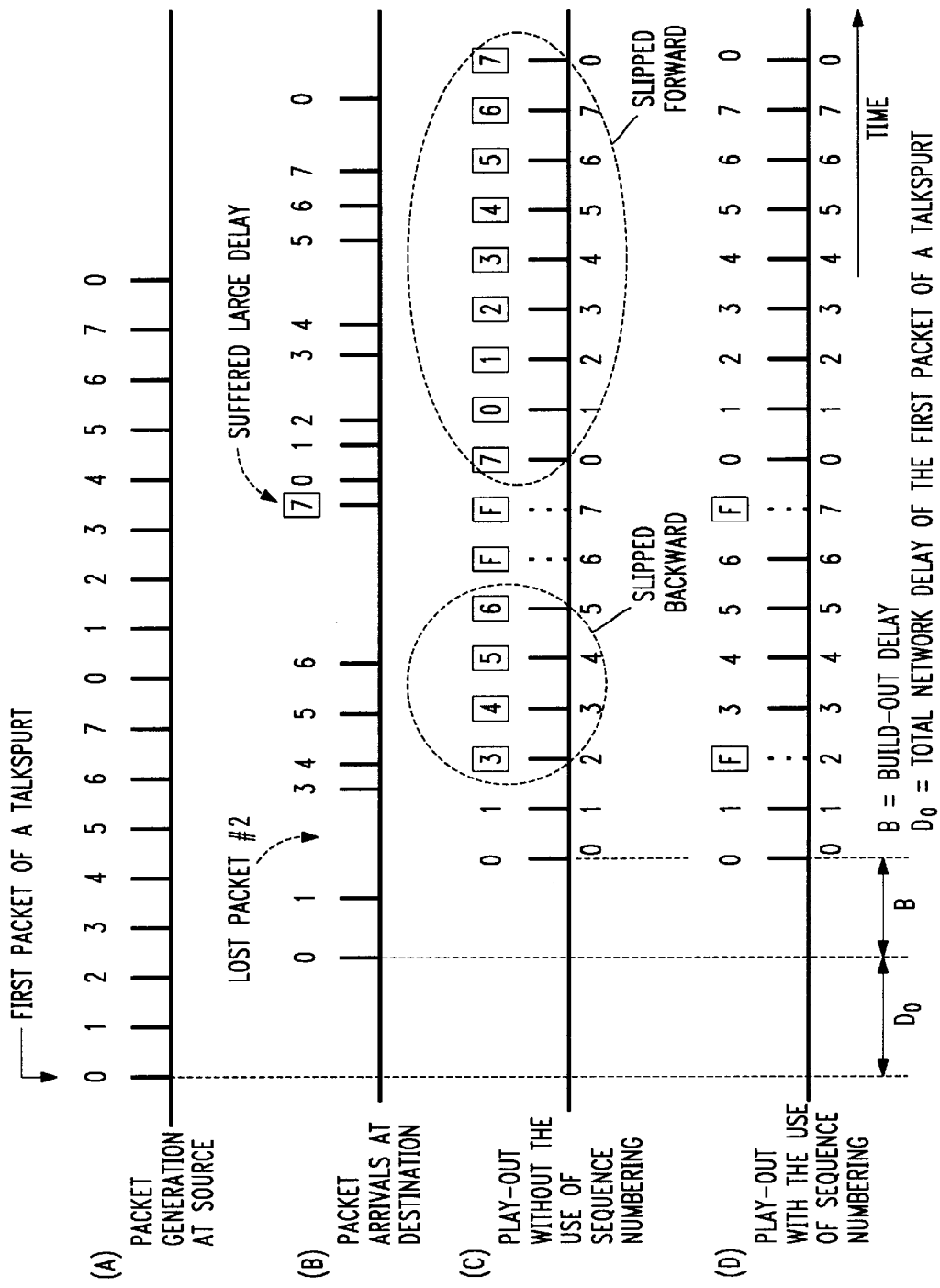
FIG. 5 shows a number of time-lines for illustrating sequence numbering and the use of a build-out delay during the duration of a call.

A set of time-lines are shown in FIG. 5 for illustrating the operation of an AAL-2/SSCS processor, sequence numbering, and the use of a build-out delay during the duration of a call.

Time-line (A) in FIG. 5 shows an illustrative talk-spurt comprising a number of packets. The latter is a stream of AAL-2 packets, which do not convey silent intervals. In this example, an AAL-2/SSCS processor creates an AAL-2 packet, each AAL-2 packet having an assigned sequence number, n, where $0 \leq n \leq 7$. As can be observed from FIG. 5, the sequence numbering repeats every n packets.

Time-line (B) shows the illustrative talk-spurt arriving at an AAL-2/SSCS processor. Each AAL-2 packets arrives in the order it is received. As can be observed from time-line (B), there is a variable delay in the arrival time of each packet (as to be expected in packet transmission). The parameter $D_o$ is defined as the total network delay of the first packet of a talk-spurt. The parameter B is defined as the build-out delay.

Also, it is assumed that the first packet with the sequence number of 2 (hereafter referred to a packet 2) has been lost and that the packet 7 has suffered a larger delay than the other packets.

For illustrative purposes, time-line (C) shows the effect on play-out of received packets if sequence numbering were not provided on the received packet stream shown in time-line (B). The AAL-2/SSCS processor begins play-out after the build-out delay, B. Packets are simply played out in the order received at periodic time intervals. Since packet 2 was lost and packet 3 was already received before the play-out time of packet 2, packet 3 is played-out in place of packet 2 at time interval 2. This results in the received packets being "slipped backward" as shown on time-line (C) of FIG. 5. At time intervals 6 and 7, there are no packets in the receive buffer (not shown). As such the AAL-2/SSCS processor inserts "FILL" (F) packets, e.g., low-level noise or extrapolated speech, into the play-out stream. Finally, packet 7 arrives in time to be played-out at the next time interval 0. This results in the remaining packets being "slipped forward" as shown on time-line (C) of FIG. 5.

In contrast, time-line (D) illustrates the advantage of using sequence numbering during play-out. Again, the AAL-2/SSCS processor begins play-out after the build-out delay, B. Packets are played out the receive buffer (not shown) in conjunction with the most recent sequence number at associated time intervals. Now, although packet 2 was lost and packet 3 was already received before the play-out time of packet 2, a fill packet (F) is played-out in place of packet 2 at time interval 2. As a result, the packets are not "slipped backward." At the associated time interval 3, packet 3 is played out. Packets continue to be played out in the correct sequence and time interval until packet 7. The latter has not yet been received for play-out at time interval 7 (as illustrated on time-line (B)). A fill packet (F) is played out instead. Finally, packet 7 arrives in time to be played-out at the next time interval 0. However, with sequence numbering, packet 7 is not played out at the next time interval 0. Instead, corresponding packet 0 is played out. As a result, the remaining packets are not "slipped forward." At this time, packet 7, which is already in the buffer, is recognized to have arrived late and hence is discarded.

AAL-2 with an Extended Header

As described above, 32 kb/s ADPCM is used during a call. However, it may become necessary, and beneficial, to change the effective coding rate during a call. For example, ITU-T G.727 standard 32 kb/s ADPCM provides the ability to drop less significant bits from the coded signal to reduce the data rate. Due to dropping of the less significant bits, the coding rate momentarily changes to 24 kb/s or 16 kb/s during moderate or high congestion states in the transmitter. Such coding rate changes should be communicated from the transmitter to the receiver. As noted above, the RES field is a five bit value that provides 32 codepoints, each of which can be used to convey either messaging or sequence numbers. However, we have realized that the above-mentioned five bit RES field is too small for some applications, e.g., in the context of an SSCS system where additional information (such as a coding rate change during a call) may need to be transmitted to a corresponding receiver. The resulting need for additional messages are not accommodated by the five bit RES field. Therefore, and in accordance with the principles of the invention, an AAL-2 RES field is extended a predefined number of bits by a priori mapping individual codepoints of the five bit RES field to indicate an extended header.

Figure 6:
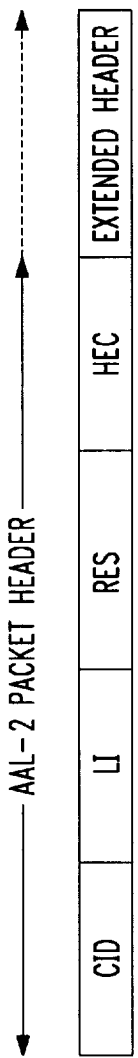
FIG. 6 shows an illustrative AAL-2 header comprising an extended header in accordance with the principles of the invention.

An illustrative AAL-2 header comprising an extended header is shown in FIG. 6.

Figure 7:
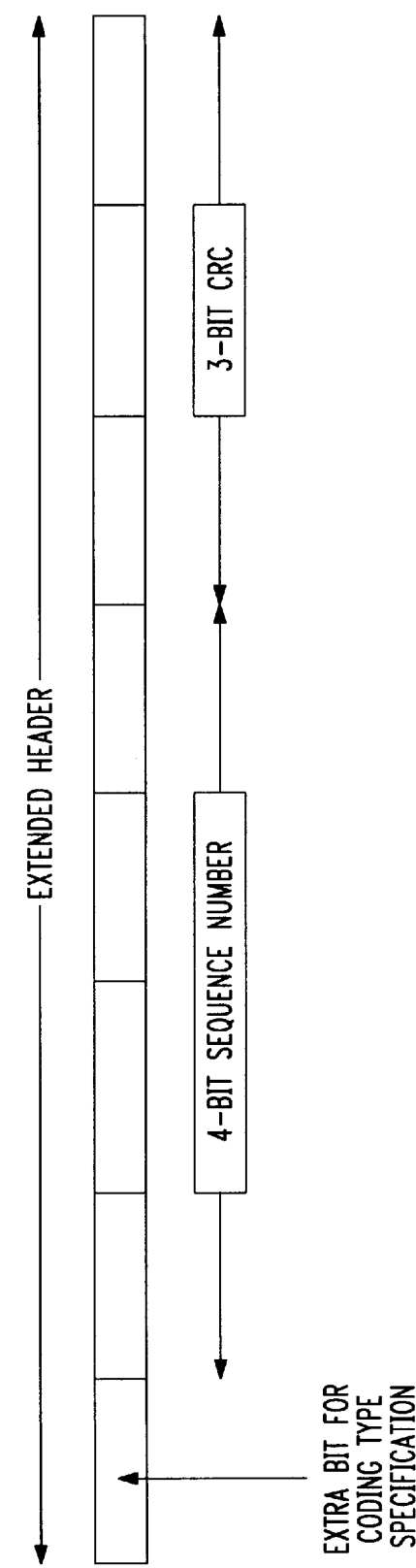
FIG. 7 shows an illustrative format for an extended header in accordance with the principles of the invention.

As can be observed from FIG. 6, the extended header is appended to the standard AAL-2 packet header, i.e., following the above-mentioned HEC field. An illustrative extended header is shown in FIG. 7. This example of an extended header includes eight bits (one octet). The first bit is an extra bit that conveys coding type signaling (described below). The next four bits convey sequence number information. In this case, the sequence number is not conveyed by the RES field, but, instead, is conveyed in the extended header. The last three bits convey a cyclic-redundancy-code (CRC) over the extended header (this is in addition to the above-mentioned HEC, which covers the non-extended portion of the AAL-2 header as described above).

In accordance with the principles of the invention, a transmitter, in essence, operates in two modes: a standard mode during which the transmitter transmits a standard AAL-2 header to a corresponding receiver, and an extended mode, during which the transmitter transmits an extended AAL-2 header to a corresponding receiver. As described further below, the transmitter dynamically switches between the standard mode and the extended mode. In accordance with the principles of the invention, the codepoint values of the five bit RES field are mapped a priori to indicate either the presence of a standard AAL-2 header (when the transmitter is in the standard mode) or the presence of an extended header (when the transmitter is in the extended mode). An illustrative mapping of the values of the 32 codepoints is shown in the mapping table of FIG. 8. It is assumed that this mapping table is stored in both a transmitter and a corresponding receiver. It should be noticed that individual codepoint values are mapped. That is, the indication of the presence of an extended header is not associated with the value of a single bit position. Rather, an individual codepoint value, e.g., 20, is predefined as signifying the presence of an extended header. Upon receipt of the AAL-2 header, the receiver decodes the AAL-2 RES field values in accordance with the mapping table of FIG. 8.

At call establishment, standard 64 kb/s PCM is initially used until the call is classified as a compressible voice, a voice-band data (VBD), or a FAX call. A signal classifier (not shown) is used as a part of the AAL-2/SSCS processor to classify incoming calls at a transmitter (call classifiers are known in the art). When the call is classified as voice, a compression method such as ITU-T G.727 32 kb/s ADPCM may be used from that point onwards. If the call is classified as a FAX call, FAX demod is used as known in the art, wherein the bit rate is reduced from 64 kb/s to a 9.6 kb/s data rate. If the ITU-T G.727 32 kb/s ADPCM is used for voice, the coding rate may dynamically change from 32 kb/s to 24 kb/s to 16 kb/s (upward and downward) during a call. The values 32 kb/s, 24 kb/s, 16 kb/s are used in low, moderate, and high, congestion states, respectively, at the transmitter. Thus the coding rate of a call may change once following call classification in the transmitter, and may change many times during a call depending on the fluctuations in traffic congestion states at the transmitter. When a coding rate change occurs, the transmitter conveys the new coding rate by used of the standard and/or extended header as shown in the mapping table of FIG. 8. When a coding type change message need be conveyed, the sequence number is conveyed without interruption except that it is part of the extended header rather than in the RES filed of the standard header.

Figure 9:
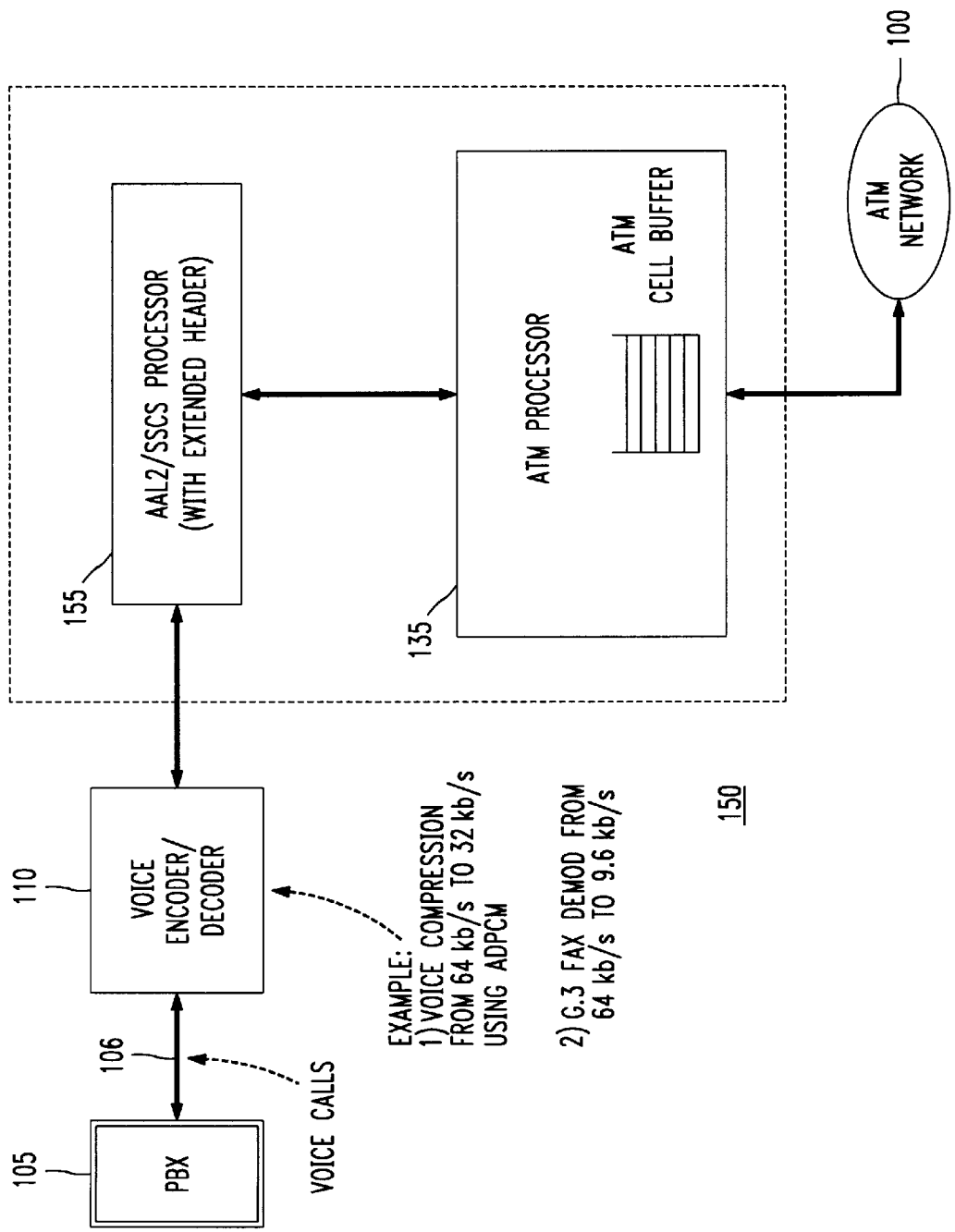
FIG. 9 shows an illustrative portion of a communications system embodying the principles of the invention.

An illustrative portion of a system embodying the principles of the invention is shown in FIG. 9. The elements of FIG. 9 are similar to the elements of FIG. 4 except for voice processor 150, which includes AAL-2/SSCS Processor 155, which provides the ability to dynamically transmit an extended header to a corresponding receiver. (The latter is similar in structure to AAL-2/SSCS Processor 155 and will not be shown or described.) Similarly, in the reverse direction, AAL-2/SSCS Processor 155 decodes received AAL-2 headers in accordance with the mapping table of FIG. 8.

Figure 10:
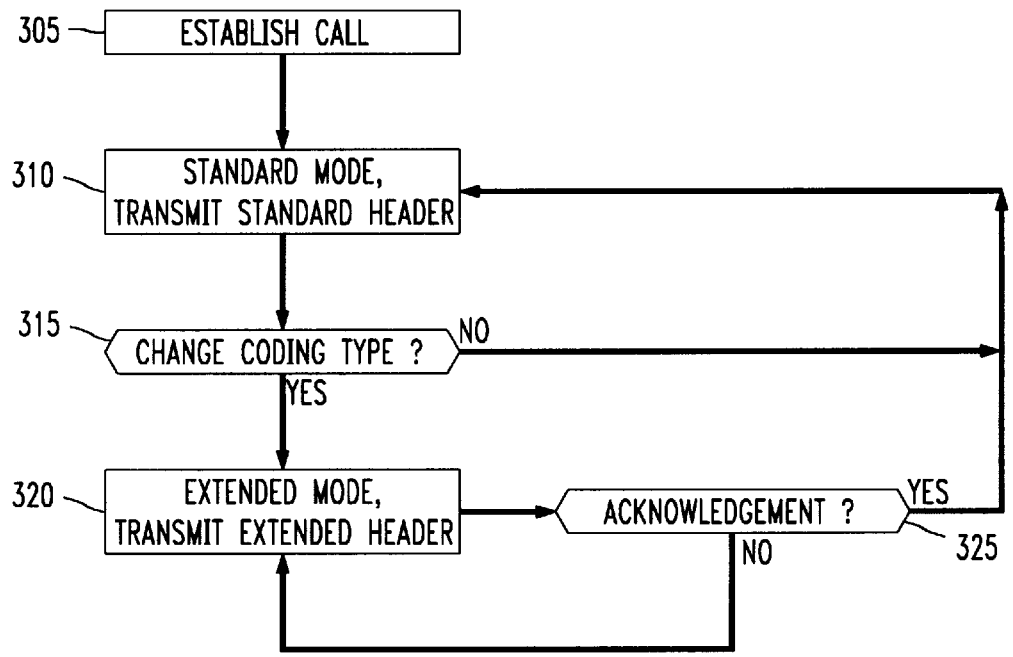
FIG. 10 shown an illustrative flow diagram in accordance with the principles of the invention for use in a transmitter.

An illustrative method for use in AAL-2/SSCS Processor 155 for transmitting AAL-2 packets in accordance with the principles of the invention is shown in FIG. 10. In step 305, AAL-2 SSCS Processor 155 establishes a call as known in the art with a corresponding receiver (not shown). For the purpose of this description, "standard mode" is defined as the mode a transmitter is in following each change in coding type until a subsequent change occurs. In step 310, AAL-2 SSCS Processor 155 transmits the appropriate standard header selected from the mapping table of FIG. 8 as a function of call type. For example, in establishing a voice call, once the coding type is agreed to between the transmitter and receiver, e.g., 32 kb/s ADPCM, four bits of the RES field are used to transmit the above-described sequence numbers for conveying packet audio using codepoint values 0 through 15 from the mapping table of FIG. 8.

However, and in accordance with the principles of the invention, AAL-2 SSCS Processor 155 may be required to send a message requiring an extended header. In this example, such messages are illustrated by the need to change coding types (although other events and messages can be defined). This is reflected in step 315. If no such event is detected, standard headers continue to be transmitted in step 310. However, if a predefined condition occurs that requires changing the coding type, AAL-2 SSCS Processor 155 switches to extended mode and transmits a header value and extended header value selected from the mapping table of FIG. 8. For example, a data queue (not shown) of AAL-2 SSCS Processor 155 may pass through different congestion states, e.g., low, medium, or high, as the queue fills up. Advantageously, the inventive concept allows the transmitter to change coding rates during the call in an efficient fashion as a function of congestion levels. For example, if the agreed upon coding type was G.727 32 kb/s ADPCM, but the transmitter has a high level of congestion, AAL-2 SSCS Processor 155 detects the need for a coding type change in step 315 as a function of congestion level and transmits an AAL-2 extended header selected from the mapping table of FIG. 8. In this example, AAL-2 SSCS Processor 155 transmits a coding point value of 17 in the RES field of the next AAL-2 packet and appends an extended header (EH), where the 0th bit of EH is set to 1 and the remaining four bits convey the appropriate sequence number. The coding point value of 17 is predefined to indicate the presence of an extended header. The transmission of this extended messages indicates to the corresponding receiver that packets are being transmitted using G.727 32 kb/s ADPCM reduced to 16 kb/s. (As defined in G.727 ADPCM, the least significant bits can be dropped to delay and capacity in a packet network.) As can be observed from the mapping table of FIG. 8, different coding types may be selected by a transmitter. Coding types 7 and 8 are placeholders for the specification of additional coding types. The abbreviation LD-CELP in the mapping table of FIG. 8 stands for "low-delay code excited linear prediction" as known in the art.

After transmission of the extended header, AAL-2 SSCS Processor 155 looks for an acknowledgment from the receiver that the coding type has been received, in step 325. If no acknowledgment is detected before the next packet has to be transmitted, AAL-2 SSCS Processor 155 transmits another AAL-2 packet with an extended header in step 320 and looks for an acknowledgment in step 325. However, upon receipt of an acknowledgment, AAL-2 SSCS Processor 155 resumes transmitting standard headers in step 310. It should be noted that this dynamic use of an extended header is more efficient than simply enlarging the AAL-2 header for the duration of particular calls, which decreases the available bandwidth. Once the messaging event has been acknowledged, the transmitter resumes use of the standard header.

Alternative methods are also possible. For example, the transition from extended mode back to standard mode can be performed by AAL-2 SSCS Processor 155 simply by transmitting the extended header information k times, where $k \geq 1$. For example, if k=3, AAL-2 SSCS Processor 155 transmits 3 sequential packets using an extended header format. Once the value of k is reached, AAL-2 SSCS Processor 155 then assumes that the receiver has changed to the correct coding type and resumes transmission using standard headers. In this alternative approach, the transmitter dynamically uses the extended header and discontinues use of the extended header after a predefined duration of time. The period of time can be selected in any number of ways, e.g., a multiple of voice packetization intervals (i.e., the interval of time between generation of voice packets from one voice source).

Figure 11:
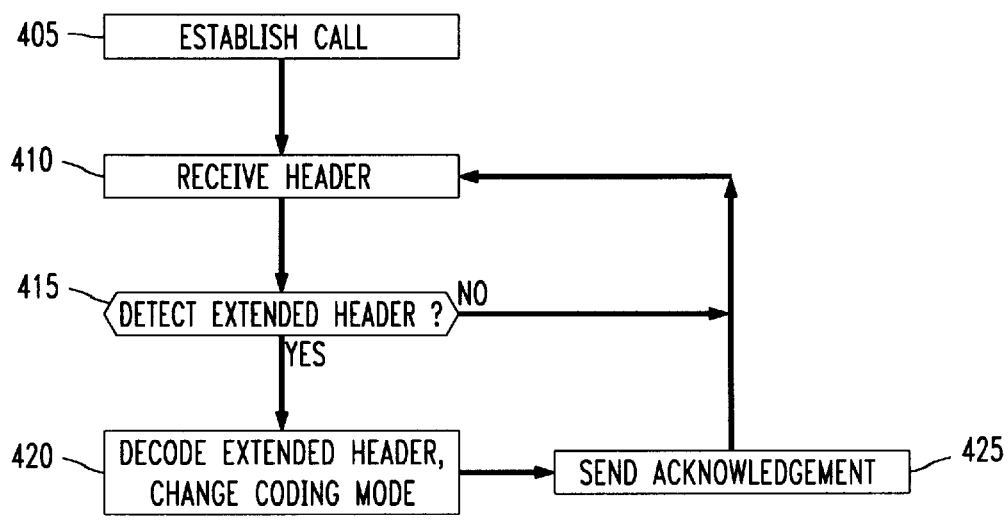
FIG. 11 shown an illustrative flow diagram in accordance with the principles of the invention for use in a receiver.

Turning now to FIG. 11, an illustrative method for use in a receiver is shown.

After establishing the call in step 405 using a particular coding rate (e.g., 64 kb/s PCM), AAL-2 SSCS Processor 155 receives headers with sequence numbers in step 410. In step 415, AAL-2 SSCS Processor 155 decodes the values of the RES field in accordance with the mapping table of FIG. 8. If no extended header is detected in step 415, then AAL-2 SSCS Processor 155 continues receiving packets in step 410. On the other hand, if an extended header is detected, AAL-2 SSCS Processor 155 switches to the respective coding type in step 420, and transmits an acknowledgment to the corresponding transmitter in step 425. AAL-2 SSCS Processor 155 then continues receiving packets in step 410.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the extended header is described in the context of an additional octet, any number of bits can be defined as the extended header. Further, although the illustrative embodiment described use of the extended header in association with messages that signaled a change in coding type, other messages representing other types of information can be defined.

What is claimed:

1. A method for use in a system transmitting ATM Adaptation Layer Type 2 (AAL-2) based packets, the method comprising the steps of:
    transmitting AAL-2 packets each AAL2 packet comprising a header that includes an RES field having five bits, the RES field conveying messaging and sequence number information to a receiver; and
    dynamically extending headers by m bits for a period of time T, the m bits conveying at least messaging information to the receiver;
    wherein the dynamically extended step extends a header by transmitting a predefined codepoint value in the RES field.

2. The method of claim 1 wherein the period of time, T, is a function of receiving an acknowledgment from the receiver of receipt of the at least messaging information in the extended header.

3. The method of claim 1 wherein the at least messaging information transmitted in the extended header represents a change of coding type between the transmitter and the receiver.

4. The method of claim 3 wherein the coding type change signals a change from 32 kb/s ADPCM to an effective lower data rate ADPCM signal.

5. A method of packet voice transmission using a normal packet header and a dynamically extended packet header wherein the bit values of said normal and dynamically extended header are used to define a multiplicity of codepoints for transmitting messages and sequence numbers from a transmitter to a receiver; the method comprising the further steps of:

making use of a first subset of code-points in said normal header for said sequence numbers;

making use of a second subset of code-points in said normal header to indicate presence of said dynamically extended header;

while said dynamically extended header is used, transmitting said sequence numbers in said extended header and using parts of said normal and extended header to transmit said messages.

6. The method of claim 5, further comprising the step of:

discontinuing use of said dynamically extended header on packets after a predefined duration of time, and thereafter transmitting said sequence numbers in said normal header using said first subset of code-points.

7. The method of claim 5, further comprising the step of:

discontinuing the use of said dynamically extended header on packets after a predefined duration of time, wherein said duration of time is equivalent to a multiple of voice packetization intervals.

8. The method of claim 5, further comprising the step of:

discontinuing the use of said dynamically extended header on packets after a pre-defined duration of time, wherein said duration of time is determined by receipt of feedback message from said receiver acknowledging receipt of at least one message in said extended header.

9. The method of claim 5, further comprising the step of:

making use of a third subset of code-points in said normal header for messages belonging to a type that do not require sequence numbers and said third subset of co-depoints also indicating absence of said dynamically extended header.

10. The method of claim 9, further comprising the step of:

discontinuing use of said dynamically extended header on packets after a pre-defined duration of time, and thereafter transmitting said sequence numbers in said normal header using said first subset of code-points.

11. The method of claim 10, further comprising the step of:

discontinuing the use of said dynamically extended header on packets after a pre-defined duration of time, wherein said duration of time is equivalent to a multiple of voice packetization intervals.

12. A method based on claims 9, further comprising the step of:

discontinuing the use of said dynamically extended header on packets after a pre-defined duration of time, wherein said duration of time is determined by receipt of feedback message from said receiver acknowledging receipt of at least one message in said extended header.

13. A method based on claim 5 wherein the packet is an ATM Adaptation Layer Type 2 (AAL-2) based packet.

14. Apparatus for use in transmitting ATM Adaptation Layer Type 2 (AAL-2) based packets, the apparatus comprising:

an AAL-2 SSCS Processor for a) transmitting AAL-2 packets, each packet comprising a header that includes an RES field having five bits, the RES field conveying messaging and sequence number information to a receiver, and b) dynamically extending the header by m bits for a period of time T, the m bits conveying at least messaging information to the receiver; and an ATM processor for transmitting the AAL-2 packets wherein the AAL-2 SSCS Processor extends the header by transmitting a predefined codepoint value in the RES field.

15. The apparatus of claim 14, wherein the period of time, T, is a function of receiving an acknowledgment from the receiver of receipt of the at least messaging information in the extended header.

16. The apparatus of claim 14 wherein the at least messaging information transmitted in the extended header represents a change of coding type between the transmitter and the receiver.

17. The apparatus of claim 16 wherein the coding type change signals a change from 32 kb/s ADPCM to an effective lower data rate ADPCM signal.

* * * * *